Figure 1:
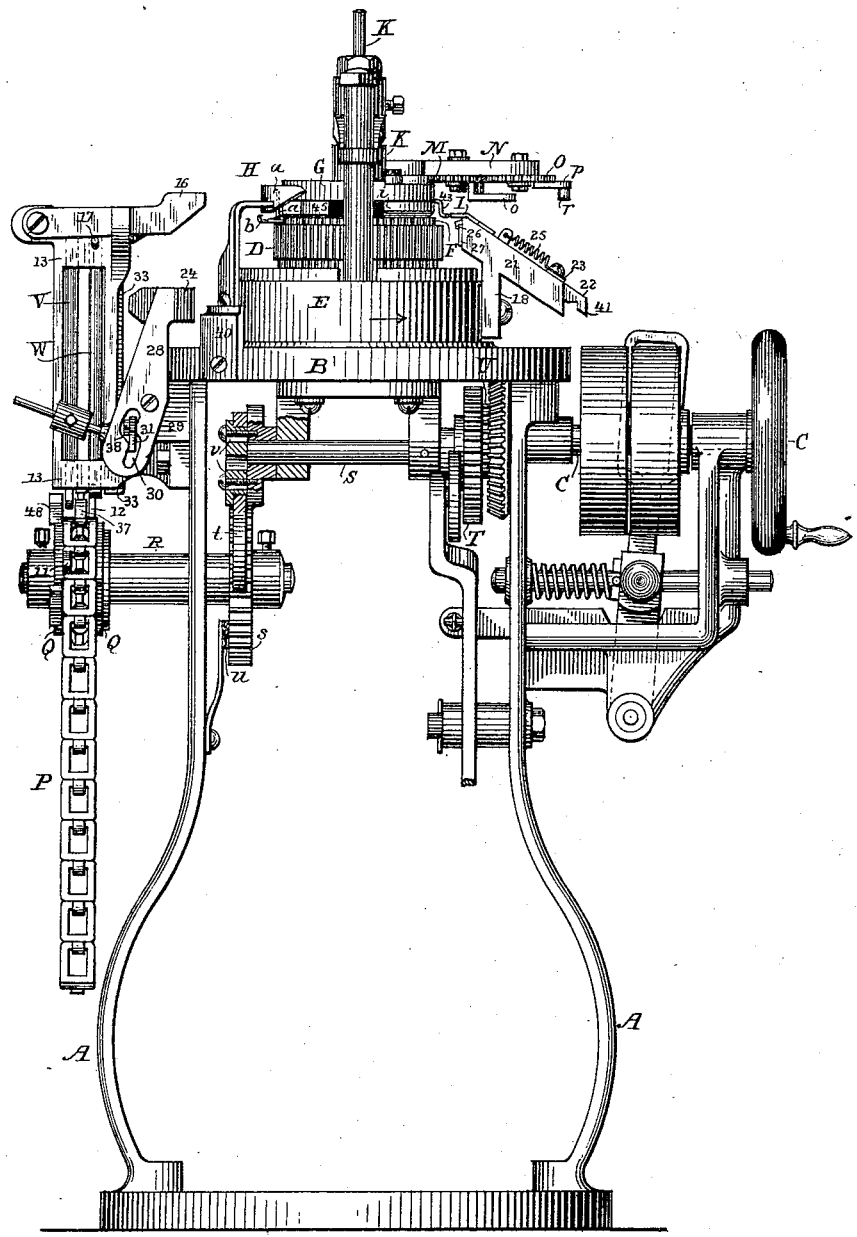

(No Model.) 7 Sheets—Sheet 1.

W. H. PEPPER, A. T. L. DAVIS & G. A. SANDERS.
KNITTING MACHINE.

No. 461,508. Patented Oct. 20, 1891.

WITNESSES
Jos. S. Latimer
Carleton E. Snell

INVENTORS
William H. Pepper
Albert T. L. Davis
George A. Sanders
BY
Arthur F. Browne
ATTORNEY (No Model.) 7 Sheets—Sheet 2.

W. H. PEPPER, A. T. L. DAVIS & G. A. SANDERS.
KNITTING MACHINE.

No. 461,508. Patented Oct. 20, 1891.

WITNESSES
Jas. S. Latimer
Carleton Snell

INVENTORS
William H. Pepper,
Albert T. L. Davis,
George A. Sanders.
BY
Arthur H. Browne
ATTORNEY (No Model.) 7 Sheets—Sheet 3.
W. H. PEPPER, A. T. L. DAVIS & G. A. SANDERS.
KNITTING MACHINE.

No. 461,508. Patented Oct. 20, 1891.

WITNESSES
Jos. S. Latimer
Carleton Elwell

INVENTORS
William H. Pepper,
Albert T. L. Davis,
George A. Sanders.
BY Arthur L. Browne
ATTORNEY.

(No Model.) 7 Sheets—Sheet 4.
W. H. PEPPER, A. T. L. DAVIS & G. A. SANDERS.
KNITTING MACHINE.

No. 461,508. Patented Oct. 20, 1891.

WITNESSES:
Jas. S. Latimer
Carleton Elwell

INVENTORS
William H. Pepper,
Albert T. L. Davis,
George A. Sanders.
BY
Arthur E. Browne
ATTORNEY.

(No Model.) 7 Sheets—Sheet 5.
W. H. PEPPER, A. T. L. DAVIS & G. A. SANDERS.
KNITTING MACHINE.
No. 461,508. Patented Oct. 20, 1891.
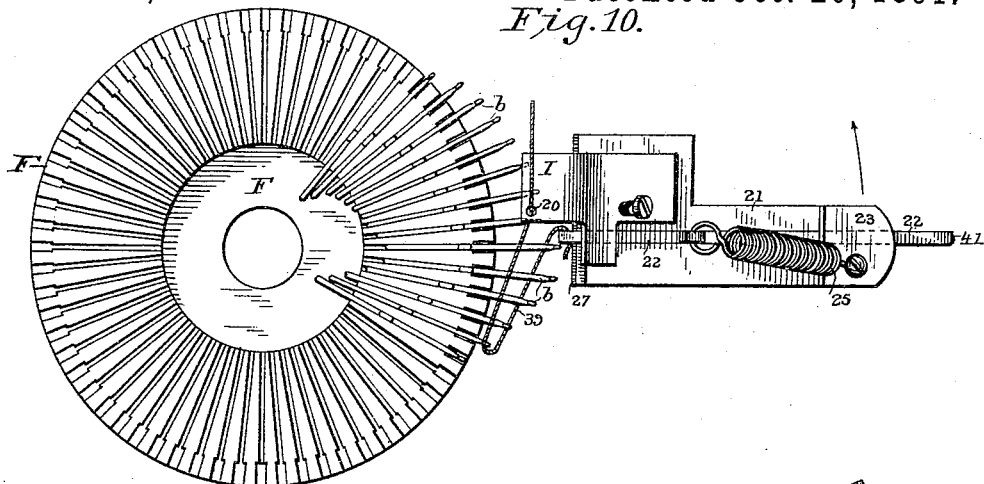
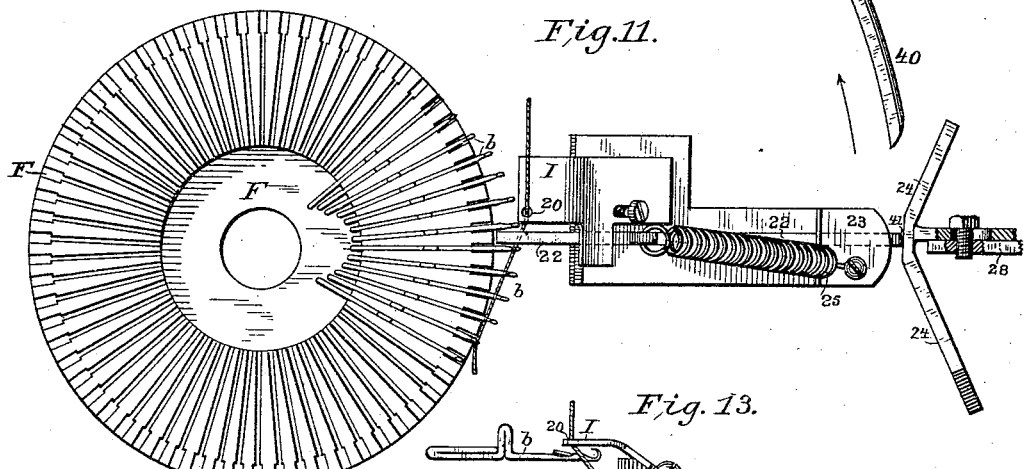
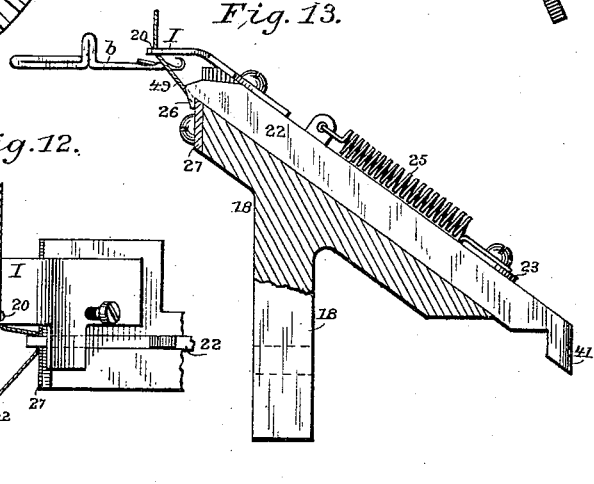
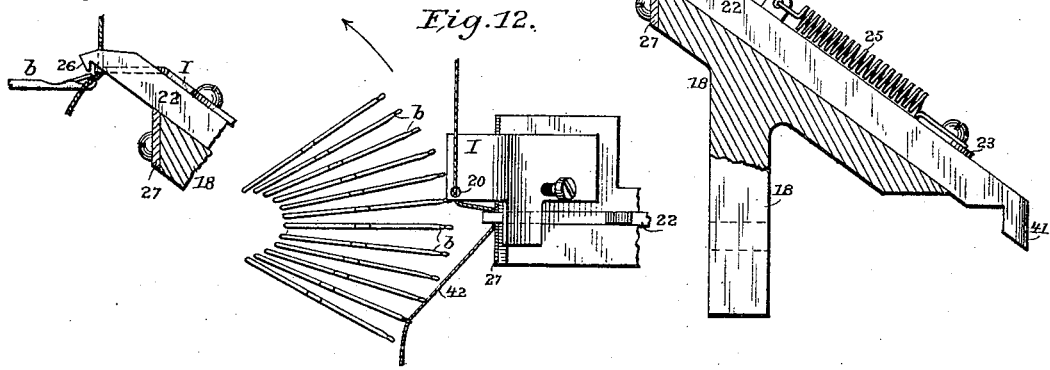
WITNESSES:
Jos. S. Latimer
Carleton Snell
INVENTORS
William H. Pepper,
Albert T. L. Davis,
George A. Sanders.
BY
ATTORNEY.

(No Model.) 7 Sheets—Sheet 6.

W. H. PEPPER, A. T. L. DAVIS & G. A. SANDERS.
KNITTING MACHINE.

No. 461,508. Patented Oct. 20, 1891.

Witnesses
Jos. S. Latimer
Carleton ?nell

Inventors
William H. Pepper,
Albert T. L. Davis,
George A. Sanders.
BY
Arthur Browne
Attorney (No Model.) 7 Sheets—Sheet 7.
W. H. PEPPER, A. T. L. DAVIS & G. A. SANDERS.
KNITTING MACHINE.
No. 461,508. Patented Oct. 20, 1891.
Fig. 15.
Fig. 16.
Fig. 17.
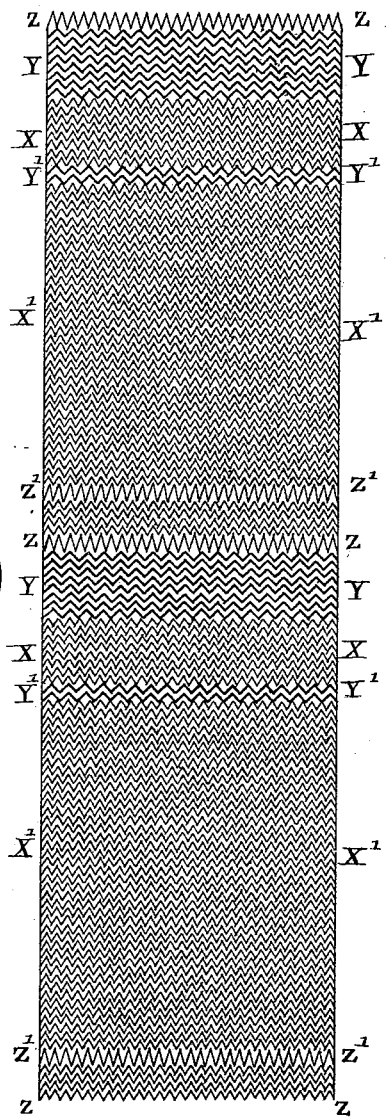
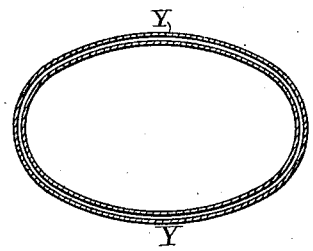
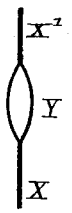
Witnesses
Jos. S. Latimer
Carleton Smell
Inventors
William H. Pepper,
Albert T. L. Davis,
George A. Sanders.
BY Arthur H. Browne
Attorney

UNITED STATES PATENT OFFICE.

WILLIAM H. PEPPER, ALBERT T. L. DAVIS, AND GEORGE A. SANDERS, OF LAKE VILLAGE, NEW HAMPSHIRE, ASSIGNORS TO THE PEPPER MANUFACTURING COMPANY, OF SAME PLACE.

KNITTING-MACHINE.

SPECIFICATION forming part of Letters Patent No. 461,508, dated October 20, 1891.

Application filed January 5, 1891. Serial No. 376,803. (No model.)

*To all whom it may concern:*

Be it known that we, WILLIAM H. PEPPER, ALBERT T. L. DAVIS, and GEORGE A. SANDERS, all of Lake Village, in the county of Belknap and State of New Hampshire, have invented certain new and useful Improvements in Knitting-Machines, of which the following is a specification.

The present invention has for its object the production of a tubular knit fabric having peripheral bands or welts, which may or may not be of the same color as the body of the fabric. The body of the fabric is composed of ribbed stitches made from a main thread or yarn, while the welt is composed of plain stitches made from an additional welt thread or yarn. The thread or yarn, however, of which the ribbed body is produced is not broken off while the welt is being knit, but is simultaneously knit to form a backing of plain stitches behind the welt. The present improvements are applied to a knitting-machine having vertical and horizontal needles, and they consist in the organization and mechanism of the machine whereby a fabric of the character indicated may be produced.

In order that the principle and operation of the invention may be understood, the improvements will be described as applied to an independent-needle circular-knitting machine having vertical and horizontal needles, such as are commonly called "latch-needle dial knitting-machines," wherein the latch-needles are mounted in stationary parts and their actuating mechanisms rotate. The invention is not, however, limited to this particular type of knitting-machines, since the improvements may be applied to other equivalent types of machines, such as those where the parts carrying the needles rotate and the needle-actuating mechanisms have no rotary motion.

Figure 2:
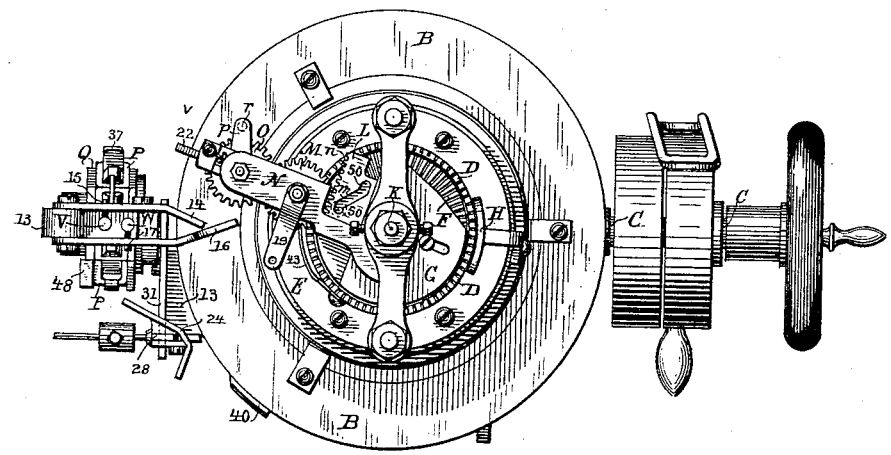
Figure 3:
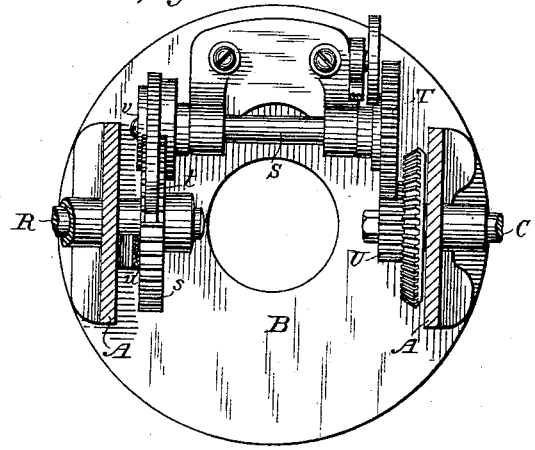
Figure 4:
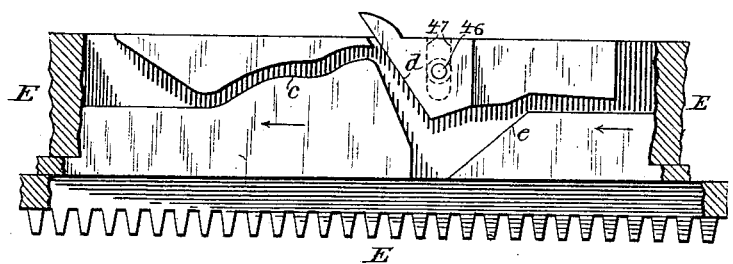
Figures 5, 6:
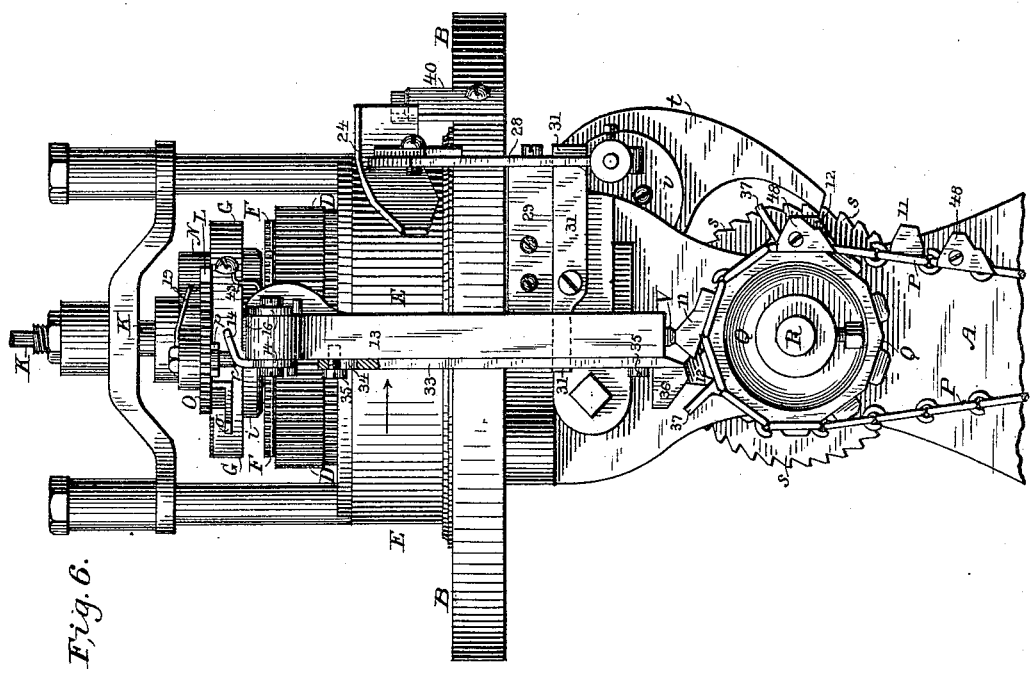
Figure 7:
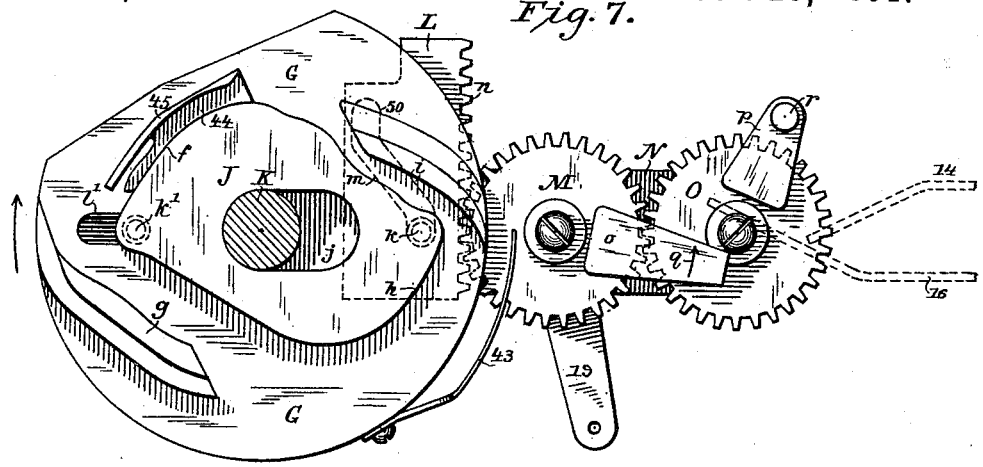
Figure 8:
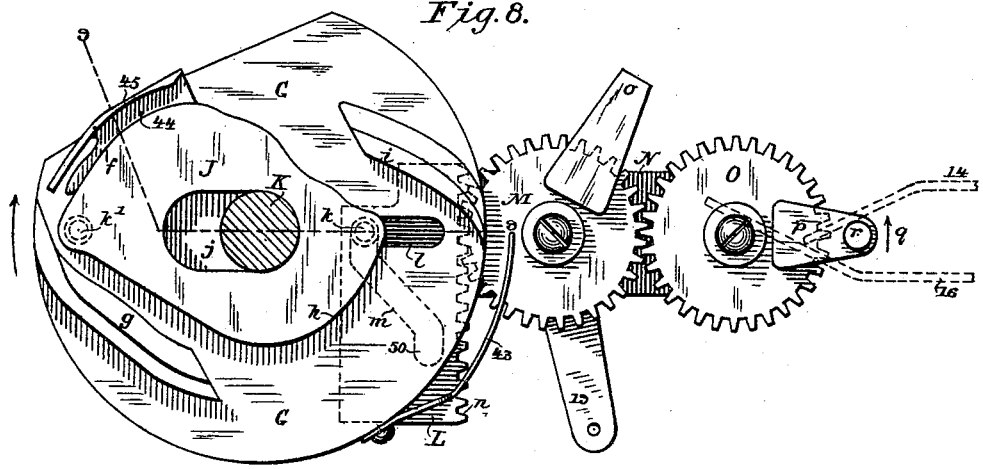
Figure 9:
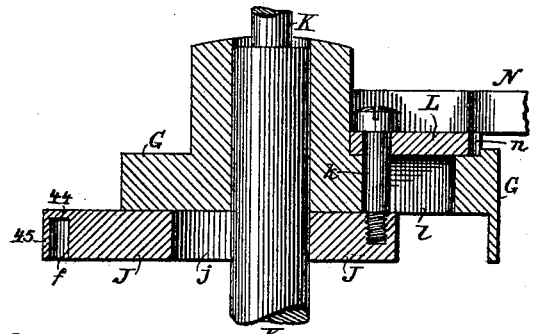
Figure 14:
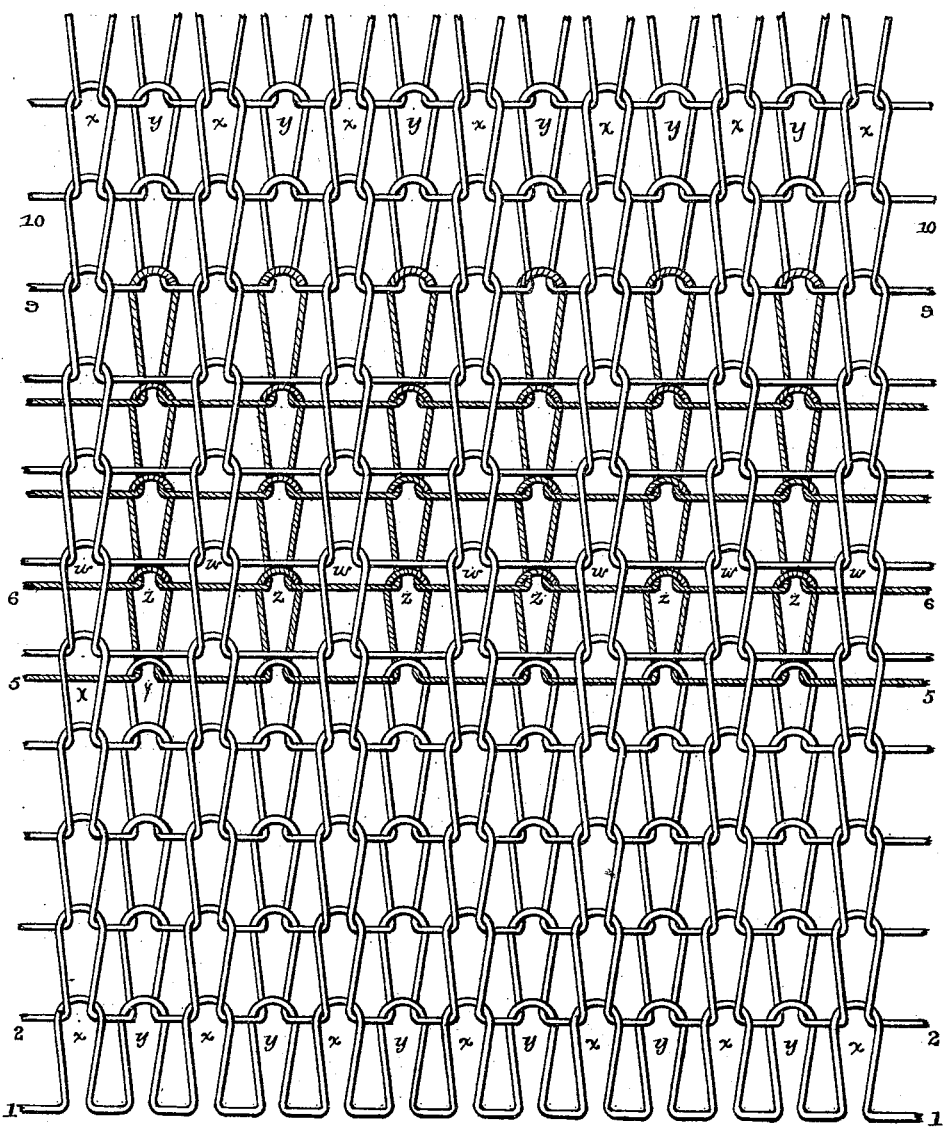

In the accompanying drawings, Figure 1 is a side view of a knitting-machine provided with the present improvements. Fig. 2 is a plan view of the same. Fig. 3 is a bottom view of the head of the machine, showing the mechanism for operating the pattern-chain which is employed. Fig. 4 is a view of the set of knitting-cams which actuate the vertical or cylinder needles. Fig. 5 is a side view, partly in vertical section, of the machine-head. Fig. 6 is a side view of the machine-head, looking at the same in a direction at right angles to the direction in which Fig. 5 is seen. Fig. 7 is an under side view of the two sets of knitting-cams for the horizontal or dial needles, this view also showing the shifting mechanism for these knitting-cams. Fig. 8 is a view similar to Fig. 7, but showing the knitting-cams in a different position. Fig. 9 is a vertical section of the dial cam-plate in a plane indicated by the line 9 9 in Fig. 8. Fig. 10 is a plan view of a portion of the horizontal or dial needles and of the welt-thread feeding and gripping mechanism, showing the position of the welt-thread as it is being first taken by the needles. Fig. 11 is a similar view showing the position the welt-thread occupies during the knitting operation, and also showing the thread-gripper in position for taking and gripping the thread. Fig. 12 is a similar view showing the gripper holding the thread and illustrating how the thread is broken. Fig. 13 is a vertical section of the welt-thread feeding and gripping mechanism. Fig. 13$^a$ is a detail view of the same mechanism in a different position. Fig. 14 is a view, on a greatly-enlarged scale, showing the formation and character of stitches of the fabric which is knit by the machine. Fig. 15 is a view, diagrammatic in character, of the fabric knit by the machine. Fig. 16 is a cross-section of the fabric. Fig. 17 is a longitudinal section of a portion of the fabric.

Figs. 7 to 13$^a$, inclusive, are drawn to a standard scale, as indicated. Figs. 1 to 3 are drawn to one-third of the standard scale; Fig. 4, two-thirds of the standard scale, and Figs. 5 and 6 one-half of the standard scale.

Referring to Fig. 1, A is the supporting-standard of the machine; B, the bed-plate of the machine-head; C, the main drive-shaft; D, the fixed vertical cylinder, which carries the cylinder or vertical latch-needles $a$; E, the rotary cam-ring provided with knitting-cams which actuate the cylinder-needles; F, the stationary dial, which carries the dial or horizontal latch needles b; G, the rotary dial cam-plate, which carries the knitting-cams which actuate the dial-needles; and H is the rotary thread-guide, which is carried by the cam-ring E. All of these parts are constructed and operated in the manner usual and common in dial knitting-machines.

The vertical or cylinder needles a are constant in their action while the machine is in operation, being at all times acted upon by the single set of knitting-cams carried by the rotary cam-ring. This set of knitting-cams is shown in Fig. 4, c being the elevating-cam, d the depressing-cam, and e the restoring-cam, all of well-known construction and operation. The cylinder-needles, being constant in their action, always take the thread from the main-thread guide H and knit therewith.

The horizontal or dial needles b b, which work between the cylinder-needles, are acted upon by two sets of knitting-cams, which alternate in their action—that is to say, when one set of knitting-cams is acting upon the dial-needles to cause them to knit the other set of cams has no action, and vice versa. These two sets of knitting-cams are carried by the rotary dial cam-plate G and are best shown in Figs. 7 and 8, which show the under side of the cam-plate, that being the side which is next to the dial-needles. Each set of these knitting-cams comprises a throwing-out cam and a drawing-in cam. The set of cams comprising the throwing-out cam f and drawing-in cam g constitutes the main set of cams, and the set of cams comprising the throwing-out cam h and drawing-in cam i constitutes the auxiliary or "welt" set of cams. When the main set of dial-cams f g actuates the dial-needles to cause them to knit, the dial-needles co-operate with the cylinder-needles and take thread from the main-thread guide H. The main dial-cams then occupy the same relation to the cylinder-needle cams that the dial-cams and cylinder-cams occupy in an ordinary dial knitting-machine. In Fig. 8 the main set of dial-needle knitting-cams f g is shown in operative position, and in Fig. 1 the dial-needles are shown co-operating with the cylinder-needles, so that both sets of needles take the main thread from the main-thread guide H, and consequently a ribbed fabric is produced.

Although the ribbed fabric thus produced is old and well known and its formation by the co-operative action of horizontal and vertical knitting-needles is also well known, nevertheless a brief description of the character of stitches in such a ribbed fabric will be given in order that the special fabric made on the present improved machine and the method of forming it may be clearly understood.

In the fabric illustrated in Fig. 14 the upper and lower portions are formed of stitches such as are formed in a "one-and-one" ribbed fabric—that is to say, in a ribbed fabric made on a dial-machine wherein the dial-needles alternate with the cylinder-needles. Each of these ribbed portions of the fabric is composed of vertical rows of loops x x, which alternate with vertical rows of loops y y. The loops x differ from the loops y in that each loop x in any horizontal row, as 1 1, passes first in front of and then behind the two strands of the loop x in the horizontal row 2 2 immediately above, whereas each loop y in any horizontal row, as 1 1, passes first behind and then in front of the two strands of the loop y in the horizontal row 2 2 immediately above. The thread or yarn, however, of which the loops y y are formed is, it will be observed, a continuation of the same thread or yarn as that of which the loops x x are formed. When such a ribbed fabric as this is formed on a dial knitting-machine, the loops x x are formed by the cylinder-needles and the loops y y are formed by the dial-needles—that is, assuming that the fabric is viewed as it comes from the machine.

In order to make what is here termed a "welt," the main set of dial knitting-cams f g is thrown out of action and the auxiliary or welt set of dial knitting-cams h i is thrown into action. This auxiliary set of knitting-cams h i is so located with reference to the cylinder-needle knitting-cams that the dial-needles are actuated thereby at a place where the cylinder-needles are entirely out of action. Preferably, as shown in the drawings, the auxiliary or welt set of dial-needle knitting-cams h i are located diametrically opposite to the main set of cams f g. Since there is but one set of knitting-cams for the cylinder-needles, which are constant in their action, it follows that when the main dial-cams f g are thrown out of action the cylinder-needles alone continue to knit upon the main thread, since the dial-needles, when acted upon by the auxiliary set of cams h i, are out of operative relation with the main-thread guide H, and consequently cannot take thread therefrom. Therefore a second thread or yarn guide I is provided, which feeds a second or welt thread to the dial-needles when said needles are actuated by the knitting-cams h i. Consequently when the set of dial knitting-cams h i is in action the dial-needles alone knit with the welt-thread and the cylinder-needles alone knit with the main thread. Fig. 7 shows the dial knitting-cams h i in operative position, and in Fig. 5 the cylinder-needles are shown in position for operating upon the main thread by themselves and the dial-needles are shown in position for operating upon the welt-thread by themselves. The effect of this separate knitting of the two sets of needles is that the cylinder-needles knit one plain web of plain stitches and the dial-needles knit a separate and distinct plain web, also of plain stitches.

The machine is so organized and constructed (as will hereinafter be particularly set forth) that ordinarily the two sets of needles co-operate together to knit a ribbed fabric. At the proper and desired time the two sets of dial knitting-cams are automatically shifted, so that the main cams $f\,g$ are thrown out of action and simultaneously the welt-cams $h\,i$ are brought into action, so that the dial-needles knit one plain web with the welt-thread while the cylinder-needles knit another plain web with the main thread. After a welt of sufficient width has been knit the two sets of dial-cams are again shifted, so that the welt set of cams $h\,i$ is thrown out of action and the main set of cams $f\,g$ is thrown into action. Consequently the two sets of needles resume the knitting of a ribbed fabric and the dial-needles cease to knit with the welt-thread, which is broken off by a proper thread-breaker.

The character of fabric which is thus formed by the conjoint and separate actions of the dial and cylinder needles is shown in Fig. 14. In this figure the welt-stitches $z\,z$, formed by the dial-needles alone, (when they are actuated by the second set of cams $h\,i$,) are distinguished by shaded lines. The shifting of the dial-cams is such that the dial-needles commence to knit with the welt-thread at the same time that they cease to knit with the main thread, so that the last row of loops or stitches which the dial-needles have taken from the main thread is still upon the dial-needles when they commence to take the welt-thread. Consequently the first row of the welt-stitches $z\,z$ is interlocked with the last row of the stitches $y\,y$. The effect of this operation is clearly indicated in Fig. 14. The horizontal row 5 5 of the stitches $x$ and $y$ is the last row of the lower ribbed portion. The stitches $y\,y$ in this row 5 5 are the loops of the main thread left on the dial-needles when they cease to take the main thread. The stitches or loops $z\,z$ in the row 6 6 next above the row 5 5 are the first line of stitches which the dial-needles take from the welt-thread, and they are interlocked with the stitches $y\,y$ in the row 5 5. As the knitting then progresses the dial-needles continue to knit with the welt-thread, each succeeding row or round of the welt-thread stitches or loops being interlocked with the preceding row or round of the welt-stitches. None of the rows or rounds of the welt-stitches $z\,z$ above the first row 6 6 (except as hereinafter stated) are interlocked with the loops $y\,y$, formed by the dial-needles with the main thread, and none of the welt-stitches $z\,z$ are in any manner interlocked with the loops or stitches $x\,x$ or $w\,w$, formed by the cylinder-needles. In other words, the welt is composed of stitches $z\,z$, which are knit entirely by the dial-needles. Consequently the welt is composed of plain stitches and not of ribbed stitches, since, as is well known, when a single set of knitting-needles knit with a single thread or yarn a plain web is produced. In the meanwhile, while the welt-stitches are being knit by the dial-needles, the cylinder-needles continue to knit with the main thread. The cylinder-needles while thus knitting alone with the main thread form the loops $w\,w$, which in the first row 6 6 above the ribbed work interlock with the stitches or loops $x\,x$. The loops $w\,w$ are just like the loops $x\,x$, except that they are joined with each other in the same row or round instead of alternating with the dial-stitches $y\,y$ or $z\,z$. The cylinder-needles consequently, while knitting independently of the dial-needles, knit a plain web, which is entirely distinct and separate from the welt knit by the dial-needles, except where both are joined to and merged into the ribbed web.

When a welt of a sufficient width has been knit, the welt set of dial-needle knitting-cams $h\,i$ is automatically thrown out of action, and simultaneously the main set of dial-needle knitting-cams $f\,g$ is automatically thrown into action. As the result, the dial-needles cease to knit with the welt-thread, (which is then automatically broken,) and consequently cease to form the welt-stitches $z\,z$, and the dial-needles again co-operate with the cylinder-needles to knit a ribbed fabric with the main thread, and consequently to form the rib-stitches $y\,y$. When the shifting of the dial knitting-cams takes place, the dial-needles carry a row or round of the welt-loops $z\,z$, as shown at row 9 9 in Fig. 14, and the stitches in the first row or round 10 10 of the upper section of the dial-stitches $y\,y$ are consequently interlocked with them, so that the welt is joined without seaming or interruption with the ribbed web at its upper as well as at its lower edge.

The drawings show in Fig. 14 the web as it comes from the machine, the outside being the wrong side of the web, and the welt consequently being inside. When the web is turned right side out, the welt shows on the outside. If the main thread and welt-thread are of different colors, as a white main thread and a red welt-thread, a fabric will be formed in which the body portions will be a solid white color and of rib-stitches, and it will have a horizontal (peripheral) welt or stripe of a solid red color and of plain stitches. The red welt entirely conceals the white backing-fabric beneath, none of the white stitches showing through. The fabric is thus distinguished and characterized by having ribbed body portions of one solid color and plain-stitch peripheral welts or stripes of a contrasting solid color. The welts, it will be observed, are distinguished from the body both by the character of stitches and by the color of the thread. The welt is also thus formed without breaking the main thread or discontinuing knitting with it, so that the fabric where the welt is formed is as thick and close as the ribbed portions of the fabric. In fact a little more quantity of thread is required to form the welt and its backing than would be required to form an equal width of ribbed web, as will be evident from an inspection of Fig. 14. The separation between the welt and its backing is clearly indicated in Figs. 16 and 17.

The object of the improved machine and its results having been set forth, there will now be described the construction of the dial-needle knitting-cams, the means for automatically shifting the same, and the means for automatically feeding in and breaking off the welt-thread.

The two drawing-in cams $g$ and $i$ (see Figs. 7 and 8) have no movement which contributes to the formation of the welt. For the purposes of the present invention they may be regarded as permanently and immovably fixed to the under side of the dial cam-plate G. Both of the throwing-out cams $f$ and $h$ are formed on diametrically-opposite faces of a sliding cam-block J. This cam-block seats against the under side of the cam-plate G and has a limited rectilinear reciprocating movement thereon. The cam-block has a central guide-slot $j$, through which extends the usual supporting-spindle K of the cam-plate G and dial F, the length of the slot $j$ determining the extent of movement of the cam-block. The cam-block is suspended from the cam-plate by two screw-bolts $k\,k'$, which screw into the cam-block and pass through two slots $l\,l'$ in the cam-plate, these slots being of sufficient length to permit the sliding movement of the cam-block. (See Figs. 7, 8, and 9.) Fig. 7 shows the position of the cam-block when the welt dial-needle knitting-cams $h$ and $i$ are in operation. Fig. 8 shows the position of the cam-block when the main knitting-cams $f\,g$ are in operation, and in both figures the arrows indicate the direction of rotation. Referring to Fig. 7, it will be seen that the dial-needles will be moved out by cam $h$ and drawn in by cam $i$, so that the knitting operation is effected. The needle-butts will then travel along the outer face of the cam-block and will be moved slightly out by the highest part of cam $f$ and again in by the innermost part of arm $g$, but not enough to have any effect on the knitting. Consequently the only cams which have any effect on the knitting in Fig. 7 are the welt-cams $h\,i$. Likewise when the cam-block is shifted, as in Fig. 8, the main cams $f$ and $g$ are alone operative and the cams $h$ and $i$ have no effect upon the knitting.

The automatic shifting mechanism which is used for shifting the cam-block J is substantially the same as the mechanism for shifting the drawing-in cam in Letters Patent of the United States, granted to William H. Pepper and Albert T. L. Davis April 23, 1889, No. 401,791, and is as follows:

L is a cam-block-actuating slide, which moves rectilinearly between proper guides on the upper face of the cam-plate G in a line at right angles to the line of movement of the cam-block J. This slide L has an inclined cam-groove $m$, through which the bolt $k$, carried by the cam-block, extends. Consequently when the cam-block-actuating slide is moved back and forth the cam-block will likewise be moved back and forth, but in a line at right angles to the line of movement of the slide. (See Figs. 2, 7, and 8.) The cam-groove $m$ and its operation are similar to that of an equivalent cam-groove set forth in Letters Patent of the United States to William H. Pepper, April 1, 1890, No. 424,497, except in one respect. At each end of the cam-groove $m$ it terminates in a prolongation 50, extending in a line parallel with the line of movement of the slide L. These prolongations receive the bolt at each limit of movement of the slide L and prevent any accidental movement of the cam-block J. The slide L is formed with a rack $n$ on its outer edge, with which meshes a pinion M, which is journaled in and beneath a bracket-arm N, secured to the cam-plate G. (See Figs. 2, 5, and 9.) Journaled in and beneath bracket-arm N and meshing with pinion M is a second pinion O. The pinion M carries a downwardly-extending crank tappet-arm $o$, and the pinion O carries a downwardly-extending crank-arm $p$, from the end of which extends a downwardly-extending tappet-pin $r$. Now it will be evident that if the tappet-arm $o$ is moved in a given direction (say in the direction of the arrow $q$ in Fig. 7) the slide L will be moved from the position shown in Fig. 7 to that shown in Fig. 8, and consequently the main knitting-cams $f\,g$ will be thrown into action, whereas if the tappet-pin $r$ be moved in the same direction (see arrow $q$ in Fig. 8) the slide L will be moved from the position shown in Fig. 8 to the position shown in Fig. 7, and consequently the welt-cams $h\,i$ will be moved into action.

The alternate movements of the tappets $o$ and $r$ in the same direction are effected through the instrumentality of a pattern-chain P and intervening mechanism, substantially as set forth in said Patent No. 401,791. The pattern-chain P (see Figs. 1, 5, and 6) is carried by a sprocket-wheel Q, fixed to a shaft R. Said shaft R carries a ratchet-wheel $s$, with which engages a gravity-pawl $t$, the backward movement of the ratchet-wheel being prevented by a spring friction-brake $u$. The pawl $t$ swings on an eccentric $v$ (see Figs. 1 and 6) on a shaft S. Shaft S carries a pinion T, (see Fig. 3,) which engages a pinion U on the main drive-shaft C. Consequently the pattern-chain is moved automatically at a uniform rate of speed, which is proportioned to the speed of the knitting operations. Hence by using a pattern-chain of a desired length with cams properly disposed thereon any effects desired may be produced on the knitted web within the scope of the machine.

The pattern-chain carries a plurality of cam projections, of which cam projections 11 and 12 control the movements of the slide L. The cam projections 11 are arranged along the outer edge of the pattern-chain, and the cam projections 12 are arranged along the inner edge of the pattern-chain, so that they travel in a different vertical plane from the cam projections 11. The cam projections 11 co-operate with a vertically-movable slide-rod V, and the cam projections 12 co-operate with a vertically-movable slide-rod W, said rods being mounted to slide in a bracket 13, carried by the bed-plate B. When one of the cam projections 11 or 12 comes in contact with one of the slide-rods V or W, it elevates the same, and the slide-rod resumes by gravity its normal lower position when the cam projection moves out of the way. The length of each cam projection and the speed of the pattern-chain are such that its slide-rod will be lifted and again lowered during less than two rotations of the cam-ring E and cam-plate G.

The outer slide-rod V co-operates with a vertically-swinging tappet-arm 14, which is pivoted at its outer end to the bracket 13. This tappet-arm is in the path of a projecting pin 15 on the slide-rod V, (see Figs. 2, 5, and 6,) so that when the slide-rod V is lifted by one of the cam projections 11 the free inner end of the tappet-arm 14 is elevated, and when the slide-rod resumes its normal lower position the tappet-arm 14 also resumes by gravity its normal lower position. The inner free end of tappet-arm 14 extends inwardly toward the axis of the knitting-machine, and when it is elevated it is directly in the path of the tappet-pin $r$ when said pin occupies the position shown in Figs. 1 and 8. The tappet $r$, rotating with the cam-ring E and cam-plate G, is brought into contact with the tappet-arm 14, and is thereby caused to turn in the direction of the arrow $q$ in Fig. 8 to the position shown in Fig. 7, thereby throwing the welt-cams $h$ and $i$ into operation. The tappet-pin $r$ as it turns is swung inwardly beyond the inner end of the tappet-arm 14. Fig. 5 shows the tappet-pin just before it swings in beyond the free inner end of the tappet-arm.

The inner slide-rod W co-operates with a vertically-swinging tappet-arm 16, which is pivoted at its outer end to the bracket 13. This tappet-arm is in the path of a projecting pin 17 on the slide-rod W, (see Figs. 1, 2, and 6,) so that when the slide-rod W is lifted by one of the cam projections 12 the free inner end of the tappet-arm 16 is elevated, and when the slide-rod resumes its normal lower position the tappet-arm 16 also resumes by gravity its normal lower position. The inner free end of the tappet-arm 16 extends inwardly toward the axis of the machine, (farther than tappet-arm 14,) and when it is elevated it is directly in the path of the tappet $o$ when said tappet occupies the position shown in Figs. 5 and 7. The tappet $o$, rotating with the cam-ring E and cam-plate G, is brought into contact with the tappet-arm 16, and is thereby caused to turn in the direction of arrow $q$ in Fig. 7 to the position shown in Fig. 8, thereby throwing the main cams $f$ and $g$ into operation. The tappet $o$ as it turns is swung inwardly beyond the inner free end of the tappet-arm 16. The tappet $o$ never comes in contact with the tappet-arm 14, since the latter does not extend toward the axis of the machine far enough to be encountered by the tappet $o$, and the tappet-pin $r$ never comes in contact with tappet-arm 16, since the upper part of said arm is cut away, (see Fig. 1,) so that pin $r$ always passes freely above it. The length of each cam projection 11 or 12 and the speed of the pattern-chain are such that a tappet-arm 14 or 16 will be lifted and again lowered during less than two rotations of the cam-ring E and cam-plate G, so that when a tappet $o$ or $r$ strikes a tappet-arm in one revolution the tappet-arm will be lowered out of the way before the next revolution is completed. After a cam projection 11 on the pattern-chain has acted, as thus set forth, to move the welt-knitting cams $h\ i$ into operative position the welt is knit until a cam projection 12 acts to throw the welt-knitting cams $h\ i$ out of operation and the main dial-needle knitting-cams $f\ g$ into operation. A ribbed fabric is then knit until a cam projection 11 again acts. It will therefore be evident that any relative arrangement of welts and ribbed portions of any desired width can be knit by a proper length of pattern-chain and by properly-disposed cam projections 11 and 12.

Reference has already been made to the feeding and breaking off of the welt-thread. It is essential to the proper formation of the welt that the welt-thread should be fed to the dial-needles the moment they are actuated by the welt-knitting cams $h\ i$, and it is equally essential that the welt-thread should be broken off as soon as the welt is completed, since otherwise the welt-thread would be wrapped around the machine and interfere with the proper knitting of the ribbed portion of the fabric. The feeding in of the welt-thread and its breaking off are automatically effected by feed and breaking mechanism, which is shown in Figs. 1 and 5, but which will be best understood by reference to the detail, Figs. 10, 11, 12, 13, and 13$^a$.

The welt-thread guide I is carried by a bracket 18, which is secured to the cam-ring E, so as to rotate therewith. (See Figs. 1 and 5.) The welt-thread is conducted to this thread-guide through a guide-eye in an arm 19, attached to the bracket-arm N. (See Figs. 2, 6, 7, and 8.) The thread-guide I occupies a horizontal plane immediately above the plane of the dial-needles, and its thread-eye 20 is so located that when a dial-needle is thrown out nearly to the maximum distance by the throwing-out cam $h$ its hooked point passes out just beyond the eye 20, as is shown in Figs. 5, 10, 11, and 13. The thread-guide I is secured to the inclined head 21 of the bracket 18, and this head is provided with a groove on its upper side, which serves as a guideway for the welt-thread gripper-slide 22. This gripper-slide is held in place in the guideway by the thread-guide I and a retaining-plate 23. The gripper-slide is capable of a longitudinal rectilinear movement in its guideway. It is moved upwardly and inwardly by a cam 24, (which will be hereinafter more particularly described,) and is moved downwardly and outwardly by a coiled spring 25, fastened at opposite ends to the gripper-slide and plate 23. The downward and outward position of the gripper-slide (see Figs. 1, 5, 10, 12, and 13) is its normal position, and in this position the vertical face of its gripping-jaw 26 (which extends downwardly from the inner end of the gripper) is held by the force of spring 25 in contact with the vertical inner face of bracket-head 21, or preferably, and as shown, in contact with a gripping-plate 27, secured to the inner end of the bracket-head. The jaw 26 constitutes the movable jaw of the gripper or thread-breaker, and the plate 27 the stationary jaw thereof.

The mechanism for moving the gripper-slide 22 inwardly and upwardly against the tension of the spring 25 is best shown in Figs. 1, 2, 5, and 6. The cam 24 is carried on the upper end of a lever 28, which is centrally pivoted to a bracket 29, secured to the bed-plate B. Below its pivot the lever 28 is formed with a cam-slot 30, in which enters one end of a lever 31, which extends at right angles to lever 28 (see Fig. 6) and is centrally pivoted to the bracket 29. The opposite end of the lever 31 enters a slot 32 in a vertically-sliding bar 33, supported by the bracket 13. (See Fig. 5.) This bar 33 is provided with vertical slots 34, in which enter screw-bolts 35, which secure the bar 33 to the bracket 13, the slots 34 permitting a vertical movement of the sliding bar 33. At its lower end the sliding bar 33 has a tapped projection 36, which co-operates with central cam projections 37 on the pattern-chain P. The normal position of the sliding bar 33 is its lower position, which it automatically resumes by gravity when displaced therefrom. When the sliding bar is in this normal lower position, the end of the lever 31, which engages cam-slot 30, is at its highest position and consequently in the highest part of the cam-slot. When in this position, the upper end of lever 28 swings outwardly to the position shown in Fig. 2. This is the normal position of lever 28, and it resumes it by gravity when displaced therefrom, the lower end of the lever being weighted for this purpose, as shown in Figs. 1 and 2. When in this normal position, the cam 24 on the lever 28 is out of the path of the lower, outer, or tail end of the gripper-slide 22. When, however, a cam projection 37 on the pattern-chain P encounters the tappet projection 36 on the sliding bar 33, thereby raising the latter, the end of lever 31 in cam-slot 30 is moved downward to the position shown in Fig. 1. In thus moving downward the end of lever 31 encounters the inclined surface 38 of cam-slot 30, thereby forcing the lower end of lever 28 outwardly, and thus moving the cam 24 inwardly into the path of the tail end of the gripper-slide 22. The gripper-slide, traveling with the cam-ring E, encounters the cam 24 in this position, and is thus moved inwardly, and as soon as it passes the cam 24 it is again restored to its normal gripping position by the spring 25. In Fig. 1 the cam 24 is shown in its inward position, where it is in co-operative relation to the gripper-slide 22. The end of lever 31 is consequently shown in this figure as occupying the lower portion of the cam-slot 30. When in this position, the opposite vertical faces of lever 31 are in contact (or nearly so) with portions of the opposite margins of the cam-slot, as shown in Fig. 1, so that the lever 28 is locked and cannot be moved in either direction. This locking of the lever 28 is important, since the lever must be prevented from being swung in one direction by the impingement of the gripper-slide 22 upon the cam 24, and it must be prevented from being swung in the opposite direction by being struck accidentally.

The duration of the interval in which the cam 24 occupies its inner position in the path of the gripper-slide is determined by the lengths of each cam projection 37 and of the tappet projection 36 and by the speed of the travel of the pattern-chain. These factors should be so arranged that the cam 24 will occupy its inner position for an interval less than the time taken by the cam-ring in making two rotations, so that if the gripper-slide 22 encounters cam 24 on one round it will not encounter it on the next. The inward movements of the gripper-slide will accordingly be determined by the positions of the cam projections 37 on the traveling pattern-chain.

In order to take up the wear on the inner face of the cam 24, it is preferably adjustably mounted on the lever 28, as shown in Figs. 6 and 11.

Normally when the two sets of needles are knitting a ribbed fabric and the welt-thread is inoperative the end of the welt-thread extends directly from the thread-eye 20 in the thread-guide I to the gripping-jaws 26 and 27, between which it is held, as shown in Figs. 12 and 13. When, however, the dial-needles are thrown out by the movement of the cam-block J, so as to knit with the welt-thread, one of the dial-needles which is pushed out nearly to the maximum distance is pushed so far that its hooked end is alongside that portion 49 of the welt-thread which extends in a downward direction, Fig. 13, from the thread-eye 20 to the gripper 26 27. The onward movement of the thread-guide and gripper carries this portion 49 of the welt-thread against the needle, the part of the thread above the needle and below the thread-guide I passing over the needle and the part of the thread below the needle and above the gripper passing beneath the needle. The welt-thread is in this manner looped around the needle and is caught by the needle-hook. As the machine continues to operate the welt-thread is drawn down through the thread-eye 20 and taken by the dial-needles. As soon, however, as the first loops taken by the dial-needles are interlocked by the loops already on the needles none of the welt-thread drawn down can slip past the needles to the gripper. Consequently a strain is brought to bear by the onward movement of the gripper on that portion 39 (see Fig. 10) of the welt-thread which extends from the needles to the gripper, and the thread is broken at this portion 39. The welt-thread then continues to be knit by the dial-needles as any thread is ordinarily knit.

When the dial-needle knitting-cams are shifted so as to cause the dial-needles to cease to knit with the welt-thread, the welt-thread should be at once broken off. Accordingly, just as soon as one of the cam projections 12 on the pattern-chain acts to move the tappet-arm 16 into the path of tappet o one of the cam projections 37 is so arranged on the pattern-chain relatively to the cam projection 12 that it acts to move the cam 24 into the path of the gripper-slide 22. As shown in Fig. 2, the parts are so arranged that the knitting-cams are shifted first, and immediately afterward the gripper-slide is moved inward. The extent of the inward movement of the gripper-slide is such (see Figs. 11 and 13ª) that the movable gripper-jaw 26 is carried above and across the portion of the welt-thread which extends from the thread-eye 20 to the needles. The gripper-slide then descends under the action of spring 25 as soon as it passes the cam 24, draws down the thread, and holds it tightly against the stationary gripper-jaw, as shown in Fig. 12. To insure positively that the jaws may grip the welt-thread so that it cannot slip out, a fixed cam 40 is employed, (see Fig. 2,) which is fixed to the bed-plate B. The tail projection 41 of the gripper-slide passes outside of this cam, the cam drawing the movable gripping-jaw 26 firmly and positively against the fixed jaw 27. As the dial-needles occupy at this stage an inward position, (being drawn inwardly by cam i,) as shown in Fig. 12, there is no danger of the welt-thread between the thread-eye 20 and the gripper being caught by the needles, and consequently the welt-thread is held in proper position for being taken by the dial-needles when they are again actuated by the welt-cams h i. A portion 42, however, of the welt-thread (see Fig. 12) remains between the dial-needles and the gripping-jaws, and the welt-thread is broken at this portion by the onward movement of the gripper.

The short broken ends of the welt-thread do not show on the completed fabric, since the side on which they apper is the wrong side of the fabric, and in any case they are quite short.

In order that the latches of the dial-needles may not accidentally close when the needles are thrown out by the welt-throwing-out cam h, a dial-needle catch-guard 43 is provided, which is attached to the cam-plate G, (see Figs. 6, 7, and 8,) and which extends horizontally immediately above the dial-needles.

An important feature in connection with the cam-block J has not yet been referred to. As shown in Figs. 7, 8, and 9, the cam-block has on one side (at its face next the cam-plate G) a horizontally-projecting plate 44, which at its outer edge carries a downwardly-projecting drawing-in flange 45. This drawing-in flange extends parallel with the throwing-out cam f at a sufficient distance therefrom to permit the passage of the needle-butts. This flange has no effect upon the knitting; but when the cam-block is moved from the position shown in Fig. 8 to the position shown in Fig. 7 it draws in all the dial-needles which are partly thrown out by the throw-out cam f, but not far enough out to fully open their latches, so as to take the main thread. If the partly-thrown-out dial-needles were not thus drawn in, the main thread would be drawn down over their closed latches by the action of the cylinder-needles, which would result either in breaking the thread or in making a few of the stitches w w (see Fig. 14) loose and uneven. It will be seen that no provision similar to the drawing-in flange 45 is needed opposite the welt-cam h, since the cylinder-needles do not pass between the dial-needles when the latter are forming the welt.

The particular arrangement of cam projections on the pattern-chain shown in the drawings produces a continuous tubular web having the sequence of ribbed body portions X X' and welts Y Y', which is illustrated in Fig. 15, the right side of the web being here illustrated. As shown in this figure, the upper part is the first part knit and the lower part is the last part knit. A broad welt Y is at the top, then a narrow ribbed part X, then a narrow welt Y', then a broad ribbed part X', and then a repetition of the same parts.

Loose courses Z Z' of stitches may be formed in the web, as shown, to cut off by and to pick on by. The mechanism for producing these loose courses is not shown in the drawings, since such mechanism is well known in independent-latch-needle circular dial knitting-machines of the general character of which the machine shown is in its old features a type. As is well known, a loose course of stitches can be produced by lowering the depressing-cam d (see Fig. 4) of the cam-ring E, and the vertical adjustment of this cam d is indicated in Fig. 4, the supporting-pin 46 thereof extending through a vertical slot 47 in the ring E. The slack-course mechanisms shown in Letters Patent of the United States, granted to William H. Pepper and Albert T. L. Davis June 11, 1889, No. 404,930, and to William H. Pepper September 5, 1882, No. 263,720, can be applied directly to the machine shown in the present drawings, no change in the mechanism thereof being necessary. The pattern-chain P is shown provided with cam projections 48 48 for producing slack courses such as are shown in Fig. 15. No novelty is claimed to exist in slacked courses in a ribbed fabric.

The sections of the fabric, each comprising the bands and welts X X' Y Y', are suitable for stocking-tops, shirt-cuffs, and drawer-bottoms. A cutting-off slack course Z is run in just preceding the wide welt Y, so that the welt is at the terminal end.

A machine similarly organized, but having a different pattern-chain, can produce any ornamental effects in striping in solid colors that may be desired.

As compared with prior knitting-machines the present improved knitting-machine is novel in its mode of operation. In the present machine there are two thread-guides, a set of vertical or cylinder needles, which constantly take thread from one only of said thread-guides, a single set of knitting-cams, which actuate said vertical or cylinder needles and which are constant in their action, a set of horizontal or dial needles, which take thread in succession first from one thread-guide and then from the other, and two sets of knitting-cams, which actuate the horizontal or dial needles in succession, one set of said knitting-cams being idle when the other is in operation. The action of the two sets of knitting-cams which actuate the dial or horizontal needles is entirely automatic in character, being controlled by a timed pattern-chain, and co-operating with the knitting mechanism is an automatically-acting thread feeder and breaker for the welt-thread. The mode of operation, therefore, may be thus stated. The vertical or cylinder needles knit constantly with the main thread, and with the main thread only, while the horizontal or dial needles knit part of the time only with the main thread, at which time they co-operate with the vertical or cylinder needles to form a ribbed web, and knit part of the time with the auxiliary or welt thread alone to form a welt of plain stitches, all of the operations being wholly automatic and the welt-thread being automatically broken at the completion of the welt.

The fabric which is produced is a novel one in this respect—viz., it is composed of alternate body portions and welts, each body portion being composed of a single thread and of rib-stitches, while each welt is composed of an independent thread and of plain stitches and is backed by a backing of the same thread as the body portions and of plain stitches, the welt and its backing being joined together only where both join the ribbed body portions.

The novel mode of operation and fabric are produced by only a comparatively few changes in the mechanism of the ordinary dial knitting-machines and of the machines described in Letters Patent Nos. 263,720, 401,791, 404,930, and 424,497, hereinbefore mentioned.

The formation of the two throw-out cams $f$ and $h$ on the single sliding cam-block J, which reciprocates between the fixed draw-in cams $g$ and $i$, is a novel feature, as is also the draw-in flange 45. The cam-block slide L, having the inclined slot $m$ terminating at opposite ends in the parallel prolongations 50 50, is also novel.

The welt-thread feeding and breaking mechanism, including its actuating mechanism, is novel. It is not to be inferred, however, that an automatic gripper controlled by a pattern-chain for gripping and breaking a thread or yarn is broadly novel. Such a gripper is not new, being set forth, for example, in Letters Patent of the United States granted to William H. Pepper and Albert T. L. Davis November 11, 1890, No. 440,606; but the construction of the improved welt-thread feeder and gripper hereinbefore set forth is novel, as are also its relation to and co-operation with the knitting mechanism. In other respects, however, the machine is old in its mechanical construction.

We claim as our invention—

1. Two thread-guides, one for a main thread and one for an auxiliary or welt thread, and two sets of needles arranged in different planes, one of said sets of needles taking said main thread alone and the other of said sets of needles taking the main thread and the welt-thread in succession, in combination with a single set of constantly-acting knitting-cams for actuating the set of needles which takes the main thread only, two sets of alternately-acting knitting-cams for actuating the set of needles which takes the main thread and welt-thread in succession, and a thread-breaker which breaks said welt-thread when said set of needles, which takes the main thread and welt-thread in succession, ceases to knit therewith, substantially as set forth.

2. Two thread-guides, one for a main thread and one for an auxiliary or welt thread, and two sets of needles arranged in different planes, one of said sets of needles taking said main thread alone and the other of said sets of needles taking the main thread and the welt-thread in succession, in combination with a single set of constantly-acting knitting-cams for actuating the set of needles which takes the main thread only, two sets of automatically-shifting and alternately-acting knitting-cams for actuating the set of needles which takes the main thread and welt-thread in succession, automatically-acting means for throwing said cams into and out of action, an automatically-acting thread-breaker, which breaks said welt-thread when said set of needles, which takes the main thread and welt-thread in succession, ceases to knit therewith, and automatically-acting means for actuating said thread-breaker, substantially as set forth.

3. Two thread-guides, one for a main thread and the other for an auxiliary or welt thread, a set of vertical needles, which takes the main thread only, and a set of horizontal needles, which takes the main thread and the welt-thread in succession, in combination with a single set of knitting-cams, which actuates said vertical needles, two sets of knitting-cams for actuating said horizontal needles, one of said sets of knitting-cams being idle when the other is in action, and a thread-gripper, which grips and breaks said welt-thread when said horizontal needles cease to knit therewith, substantially as set forth.

4. Two thread-guides, one for a main thread and the other for a welt-thread, a set of vertical needles, which takes the main thread only, and a set of horizontal needles, which takes said main thread and said welt-thread in succession, in combination with a single set of knitting-cams, which actuates said vertical needles, two sets of knitting-cams, which actuate said hrizontal needles in succession, one of said sets of cams being idle when the other is in action, an automatically-acting thread-gripper, which automatically moves to take and grip said welt-thread when said horizontal needles cease to knit therewith, and automatically-acting means for actuating said thread-gripper, substantially as set forth.

5. Two thread-guides, one for a main thread and the other for an auxiliary or welt thread, a set of vertical needles, which takes said main thread only, and a set of horizontal needles, which takes said main thread and said welt-thread in succession, in combination with a single set of constantly-acting knitting-cams, which actuates said vertical needles, a main set of knitting-cams, which actuates said horizontal needles and causes the same to co-operate with said vertical needles to knit a ribbed web, a welt set of knitting-cams, which actuates said horizontal needles and causes the same to knit a plain web with the welt-thread, said main set of knitting-cams being thrown out of action when said welt set of knitting-cams is thrown into action, and vice versa, automatically-acting mechanism, which controls the action of said two sets of knitting-cams, which actuate the horizontal needles, an automatically-acting thread-gripper, which automatically moves to take and grip the welt-thread when said welt set of knitting-cams is thrown out of action, and automatically-acting means for actuating said gripper, substantially as set forth.

6. A dial cam-plate and two draw-in cams thereon, in combination with a movable cam-block carried by said cam-plate and movable between said draw-in cams, two throw-out cams being carried by said cam-block, whereby two sets of knitting-cams are provided, only one of which is operative at one time, substantially as set forth.

7. A dial cam-plate and two draw-in cams thereon, in combination with a movable cam-block carried by said cam-plate and movable between said draw-in cams, two throw-out cams being carried by said cam-block, a cam-block-actuating slide having an inclined slot terminating at each end in a prolongation parallel with the line of movement of said slide, and a pin carried by said cam-block, which enters in said inclined slot, substantially as set forth.

8. Two sets of knitting-needles, which normally co-operate with each other, means for actuating said two sets of needles, and means for throwing one of said sets of needles out of co-operation with the other set, in combination with a draw-in flange, which has no effect on the knitting operations, but which draws in the partly-thrown-out needles of the set which is thrown out of co-operative action, substantially as set forth.

9. A dial cam-plate and two draw-in cams $g$ and $i$, in combination with two movable throw-out cams $f$ and $h$, which are connected together, so as to reciprocate simultaneously in the same direction between said draw-in cams, substantially as set forth.

10. A dial cam-plate, a draw-in cam $g$ thereon, in combination with a movable throw-out cam $f$, movable to and from said draw-in cam, and a movable draw-in flange 45 outside of and opposite said throw-out cam and movable therewith, substantially as set forth.

11. A dial cam-plate, two draw-in cams $g$ and $i$ thereon, in combination with a movable cam-block movable on said cam-plate, two throw-out cams $f$ and $h$, carried by said cam-block, said cam $f$ being adapted to co operate with said draw-in cam $g$ and said cam $h$ being adapted to co-operate with said draw-in cam $i$, and a draw-in flange 45, connected and movable with said cam-block, said flange being outside of and opposite to said throw-out cam $f$, substantially as set forth.

12. A set of hooked knitting-needles and their actuating mechanism, in combination with a thread-guide, which guides a thread or yarn, and a thread-gripper, which normally grips and holds said thread after it passes said thread-guide, there being a movement relatively between said set of needles on the one part and said thread guide and gripper on the other part, said thread guide and gripper being located in different planes from each other and being at different distances from said needles, and the set of needles being located in a plane intermediate between said thread-guide and said gripper, said set of needles being so located relatively to said thread-guide and thread-gripper that when said needles occupy their drawn-in position their hooks do not pass between said thread guide and gripper, but when said needles occupy their thrown-out position their hooks pass between said thread-guide and said gripper, whereby the hooks of the needles are brought in contact with the portion of the thread which extends from said thread-guide to said gripper, substantially as set forth.

13. A set of horizontal hooked knitting-needles and their actuating mechanism, said set of needles having no rotary movement, in combination with a rotary thread-guide, which guides a thread or yarn, and a rotary thread-gripper rotating therewith, which normally grips and holds said thread after it passes said thread-guide, said thread-guide being located above the plane of said set of needles and in such position in reference to the hooks of said needles that when said needles are drawn in they do not pass beneath said thread-guide, but when they are thrown out they pass beneath said thread-guide with their hooks beyond the same, and said thread-gripper being located, when it is gripping the thread, below said thread-guide and the plane of said needles farther from said needles than said thread-guide and beyond the hooks of said needles when they are thrown out, substantially as set forth.

14. A stationary dial, a set of horizontal hooked needles carried by said dial, and the actuating mechanism for said needles, in combination with a rotary thread-guide having a thread-eye through which the thread passes, said thread-eye being above the plane of said needles and at a radial distance from the axis of the dial, which is between the positions occupied by the hook of any one of said needles when drawn in and when thrown out, and a rotary thread-gripper rotating with said thread-guide, which normally grips and holds said thread after it passes through said thread-eye, said gripper, when gripping the thread, being located beneath the thread-eye and the plane of said needles and being located farther from the axis of the dial than the outermost position of the hook of any one of the needles, substantially as set forth.

15. A set of knitting-needles and a thread-guide from which a thread passes to said needles, in combination with a thread-gripper, which has two jaws, one of which is a movable jaw movable to and from the other jaw, said movable jaw being adapted to move in one direction, so as to pass to one side of the portion of the thread extending between said thread-guide and said needles and then to move in the opposite direction and thereby draw said thread to the other jaw of the gripper, and means for moving said movable jaw, substantially as set forth.

16. A horizontal set of knitting-needles and their actuating mechanism, said set of needles having no rotary movement, in combination with a rotary thread-guide, which leads a thread to said needles, and a rotary thread-gripper rotating with said thread-guide, said gripper having a fixed jaw located below the plane of said thread-guide and of said needles and farther from the axis of rotation than said thread-guide and said gripper having a movable gripping-jaw, which is adapted to be moved above and nearer to the axis of rotation than the portion of said thread which extends from said thread-guide to said needles and to be moved in the opposite direction to draw down the thread to the fixed gripping-jaw, and means for moving said movable jaw, substantially as set forth.

17. The bracket 18, having the fixed gripping-jaw 27, and the gripper-slide 22, sliding on said bracket and having the gripping-jaw 26, in combination with the cam 24, movable into and out of the path of said gripper-slide, said cam moving said gripper-slide in one direction, and a spring 25, which moves said gripper-slide in the opposite direction, substantially as set forth.

18. The rotary bracket 18, having fixed gripping-jaw 27, and the gripper-slide 22, sliding on said bracket and having the gripper-jaw 26, in combination with cam 24 for moving said gripper-slide, said cam being movable into and out of the path of said gripper-slide, a traveling pattern-chain, and mechanism intermediate said pattern-chain and cam 24 for moving said cam, substantially as set forth.

19. The rotary bracket 18, having fixed gripper-jaw 27, and the gripper-slide 22, sliding on said bracket and having gripper-jaw 26 and tail projection 41, in combination with means for moving said gripper-slide in one direction, and spring 25 and fixed cam 40 for moving it in the opposite direction, substantially as set forth.

In testimony that we claim the invention above set forth we affix our signatures in presence of two witnesses.

WILLIAM H. PEPPER.
ALBERT T. L. DAVIS.
GEORGE A. SANDERS.

Witnesses:
LEROY M. GOULD,
HARRIE D. BROWN.